(12) United States Patent
Moon et al.

(10) Patent No.: US 7,813,280 B2
(45) Date of Patent: Oct. 12, 2010

(54) SYSTEM AND METHOD FOR ESTIMATING INTERNET-WIDE TRANSMISSION PATH AND TRANSMISSION DELAY

(75) Inventors: Sue Moon, Daejon (KR); Dong Kee Lee, Seoul (KR); Keon Jang, Chungcheongnam-do (KR); Chang Hyun Lee, Chungcheongbuk-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 101 days.

(21) Appl. No.: 12/348,433

(22) Filed: Jan. 5, 2009

(65) Prior Publication Data

US 2010/0103827 A1    Apr. 29, 2010

(30) Foreign Application Priority Data

Oct. 23, 2008    (KR) ............... 10-2008-0103956

(51) Int. Cl.
*H04L 12/26* (2006.01)
*H04L 12/56* (2006.01)
*G06F 15/173* (2006.01)

(52) U.S. Cl. .............. 370/230.1; 370/232; 370/238; 370/395.2; 709/238

(58) Field of Classification Search ...... 370/229–238.1, 370/254–258, 395.2; 709/238–243
See application file for complete search history.

(56) References Cited

U.S. PATENT DOCUMENTS

| 7,043,237 | B2 * | 5/2006 | Snyder et al. | 455/425 |
| 7,111,074 | B2 * | 9/2006 | Basturk | 709/241 |
| 7,295,960 | B2 * | 11/2007 | Rappaport et al. | 703/13 |
| 7,363,370 | B2 * | 4/2008 | Collazo | 709/224 |
| 2007/0008884 | A1 * | 1/2007 | Tang | 370/230 |

* cited by examiner

*Primary Examiner*—Tri H Phan
(74) *Attorney, Agent, or Firm*—Adam K. Sacharoff; Much Shelist

(57) ABSTRACT

Disclosed herein is a system and method for estimating an Internet-wide transmission path and transmission delay. The system includes indexing construction means configured to function as storage for storing the results of actual measurement of transmission delay for all destinations on the Internet, and configured to, in order to search for necessary actual measurement results using Autonomous System (AS) numbers, translate IP addresses constituting the actual measurement results into AS numbers and index respective path segments with AS numbers, mapping means for mapping the IP addresses of queried two points to AS numbers, AS path estimation means for estimating an AS path between the two AS numbers, and path stitching means for searching for respective path segments constituting the estimated AS path, stitching the found path segments together and stitching IP paths corresponding to the AS path, thereby obtaining a plurality of stitched paths and corresponding transmission delay.

14 Claims, 5 Drawing Sheets

SYSTEM AND METHOD FOR ESTIMATING INTERNET-WIDE TRANSMISSION PATH AND TRANSMISSION DELAY

BACKGROUND OF THE INVENTION

1. Field of the Invention

The present invention relates generally to a system and method for estimating an Internet-wide transmission path and transmission delay, and, more particularly, to a method of estimating an Internet-wide transmission path and transmission delay between two points on the Internet only using collected and disclosed actually measured data without requiring additional active actual Internet measurement.

2. Description of the Related Art

Currently, on the Internet, massive Internet applications and services that require close interaction between users distributed throughout the world have appeared. Representative examples of these services include Peer-to-Peer (P2P) file sharing, Content Distribution Networks (CDNs), and Massively Multi-player Online Games (MMOGs). These services require continuously updated information related to the variation in the internal performance of the Internet, that is, massive amounts of actually measured Internet data, in order to offer better services.

Measures of such performance evaluation include transmission delay, packet loss rate, effective bandwidth, and an IP hop count. Since the current Internet was implemented and started to be used before the concept of actual network performance measurement was firmly established, it does not externally reveal network-internal performance characteristics. Accordingly, various Internet infrastructures for actually measuring the performance of the Internet have been proposed. However, these systems are individually operated by operators who installed the corresponding systems, and are operated using different actual measurement mechanisms based on different performance evaluation measures.

Some systems are capable of processing data only offline. Because the actual measurement mechanisms of these actual measurement systems are very different from each other, it is difficult to share actual measurement data with other systems or reuse the data for other purposes. The reason for this is that existing actual Internet measurement infrastructures were designed without respect to compatibility or interoperability with current Internet services.

Accordingly, in order to offer higher quality services to users, current Internet applications employ their unique actual measurement systems for evaluating Internet performance and making decisions instead of utilizing existing systems. However, the cost that is required for the direct implementation, installation and operation of an individual unique actual measurement system is too high for Internet users or service developers to accept, or they are unable to pay such a cost. Since intermediate systems, such as firewalls or routers, sometimes block active Internet measurement packets (e.g., ICMP packets), there are cases where an attempt to implement such a system is impossible for Internet end users or application developers.

Accordingly, the technology for effectively providing actual Internet performance measurement data useful for various types of Internet applications is required.

The goals of the technology are (1) to enable planetary-scale or internet-wide queries about actual Internet performance measurement data to be performed (that is, enable queries to be performed between arbitrary hosts or nodes distributed throughout the Internet), (2) to enable the obtainment of values closest to actual measurement values expected by a querier when it is assumed that the querier can obtain results by directly performing actual measurement, (3) to enable the provision of sufficient and efficient answers to the extent of completely replacing an existing tendency of individual applications to implement and use their own actual measurement systems (the presentation of methodology in which the special and temporal costs for the processing of queries are optimized), and finally (4) to enable designing of an extendable system to control rapidly increasing actual measurement data and system users.

SUMMARY OF THE INVENTION

Accordingly, the present invention has been made keeping in mind the above problems occurring in the prior art, and an object of the present invention is to provide estimated values for two queried arbitrary points on the Internet by estimating an AS (Autonomous system) path and transmission time between the two points, searching for path segments necessary for the AS path, and stitching the found path segments.

The present invention utilizes a massive amount of previously collected and disclosed actual measurement data, instead of directly collecting necessary data through actual measurements. Although a massive amount of actual measurement data is currently present on the Internet, the data is neglected because there is no methodology for effectively sharing the data with other systems or reusing the data for other purposes.

A task of the present invention is to selectively and effectively extract data segments necessary for the processing of a query from the massive amount of actual measurement data in response to a user's query and complete an answer to the user's query. Although a great number of actual measurements are being performed on the Internet, the actual measurements are insufficient to completely cover the entire Internet because there are great numbers of hosts and nodes on the Internet.

Accordingly, another task of the present invention is to process users' queries by approximating missing links that are not included in existing actual measurement data but are required to process the users' queries. In order to deal with these tasks, the present invention employs a path stitching process.

The path stitching process will be described using an example below.

When two arbitrary users communicate with each other (exchange Internet packets) over the Internet, the packets are exchanged between the two users through a dynamically established Internet path. An Internet path (hereinafter referred to as a 'path') is composed of a plurality of AS hops from a macroscopic point of view, and is composed of a plurality of router hops within each AS from a microscopic point of view. For example, if a packet is sent from www.kaist.ac.kr to www.snu.ac.kr, the packet is transferred sequentially through AS KAIST, HANARO, KT and SNU at the AS level. Meanwhile, for example, within AS KT, the packet is transferred through a plurality of KT routers to the ingress router of AS SNU, which corresponds to an AS hop next to AS KT.

The gist of the present invention is to segment a massive amount of existing actual measurement data into pieces of data for respective ASes so as to effectively classify, store, update and query the massive amount of data, and to, when a user poses a query about two arbitrary points on the Internet, complete estimated values corresponding to the user's query by estimating an AS path for the two queried points, searching for path segments necessary to constitute the AS path estimated from indexed data and stitching these path segments together, and provide the estimated values to the user.

In order to accomplish the above object, the present invention provides a system for estimating an Internet-wide transmission path and transmission delay, including indexing construction means configured to function as storage for storing the results of actual measurement of transmission delay for all destinations on the Internet, and configured to, in order to search for necessary actual measurement results using AS numbers, translate IP addresses constituting the actual measurement results into AS numbers, index respective path segments with AS numbers and store them; mapping means for mapping the IP addresses of two points queried by a user to AS numbers; AS path estimation means for estimating an AS path between the two AS numbers obtained through the mapping by the mapping means; and path stitching means for searching for respective path segments constituting the estimated AS path, stitching the found path segments together and stitching IP paths corresponding to the AS path, thereby obtaining a plurality of stitched paths and corresponding transmission delay.

Additionally, in order to accomplish the above object, the present invention provides a method of estimating an Internet-wide transmission path and transmission delay, including steps of (a) mapping means mapping the IP addresses of two points queried by a user to AS numbers; (b) AS path estimation means estimating an AS path between the two AS numbers to which the IP addresses are mapped at step (a); and (c) path stitching means searching for path segments constituting the estimated AS path through an indexing construction means, stitching the path segments together, and stitching IP paths corresponding to the AS path, thereby obtaining a plurality of stitched paths and corresponding transmission delay.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
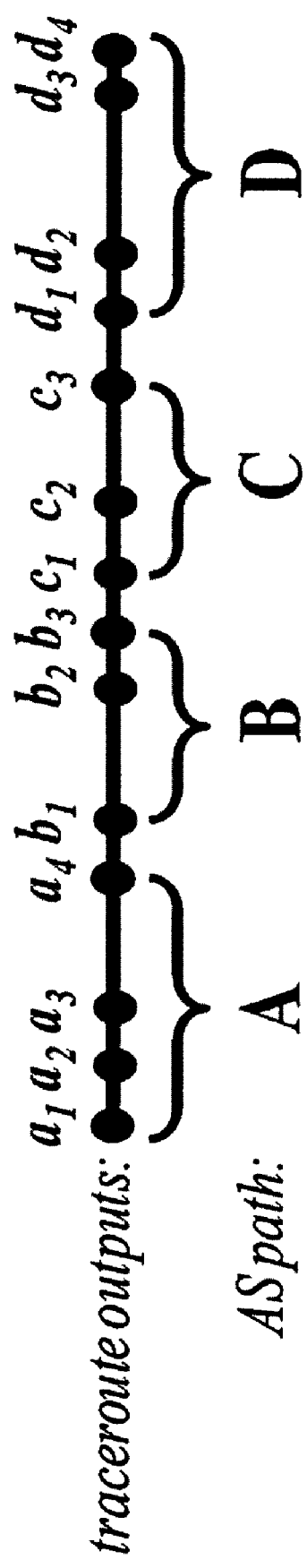
FIG. 1 is a diagram showing an example of translating IP addresses into AS numbers and indexing respective portions of a traceroute result with AS numbers.

Reference now should be made to the drawings, in which the same reference numerals are used throughout the different drawings to designate the same or similar components.

Meanwhile, it should be noted that if detailed descriptions of well-known functions and constructions related to the present invention are determined to make the gist of the present invention unclear, the detailed descriptions will be omitted in the following specification.

The present invention will be described in detail below with reference to the accompanying drawings.

Prior to the description of the overall flow of a system and method for estimating an Internet-wide transmission path and transmission delay according to the present invention, data, notation and the definitions of terms used in the present invention will be described first.

1. Data Set

In the present invention, two types of data are chiefly used.

The first type of data is a traceroute archive set up through the CAIDA Ark Project, and the second type of data is Border Gateway Protocol (BGP) routing table snapshots collected in the University of Oregon's RouteViews project and RIPE's RIS project.

CAIDA Ark includes special actual measuring monitors that were installed at 20 important points of the Internet in order to actually measure Internet IP-level topology information. These monitors periodically perform actual traceroute measurements on all /24 IP prefixes that can be reached by packets on the Internet. Actual traceroute measurement results include information about the IP addresses of all IP hops through which a packet passes to be transferred from an Ark monitor to an intended destination, and information about the times taken to reach the corresponding hops. This data is stored and disclosed at intervals of one hour. BGP routing table snapshots are collected at intervals of two hours, and information about paths through which packets are transferred from 100 principal ASes on the Internet for respective destination IP prefixes on the Internet is recorded in this table.

These data archives are greatest data archives from which IP-level topology information and AS-level topology information can be periodically obtained for the current Internet.

2. Notation

Assuming that N is a set of Internet hosts, an arbitrary n that belongs to N is an Internet host having intf(n) network interfaces. The IP addresses of the respective interfaces are $n_1$, $n_2$, ..., and $n_{intf(n)}$. This Internet host may be an Internet end host, or may be a router that is an Internet end host. When the arbitrary interface address of the Internet host n is specified, it is simply denoted by n.

AS(n): origin ASes of a host n path(n,m): a set of IP paths from host n to host m ASpath(n,m): a set of AS paths from AS (n) to AS (m)

Due to the Multiple Origin ASes (MOAS) phenomenon of the Internet, AS(n) may be one or more ASes. Furthermore, each of path(n, m) and ASpath(n, m) may contain one or more paths. One path contained in path (n,m) is formed by consecutively arranging IP addresses that constitute the path, while one path contained in ASpath(n,m) is formed by consecutively arranging AS numbers that constitute the path.

Furthermore, in the present invention, an intra-domain path and an inter-domain path are distinguished from each other in the notation.

:A: a set of path($a_i$,$a_e$), where $a_i$ is an ingress router and $a_e$ is an egress router of A.

Here, ':A:' refers to a set of paths that connect the ingress point of AS A with the egress point of AS A. That is, these paths connect the ingress and egress routers of AS A with each other. Since all packets passing through AS A enter through the ingress of AS A and exit through the egress router, a path is selected from among :A: and is then used.

A::B a set of path($a_e$,$b_i$), where $a_e$ is an egress router A and $b_i$ is an ingress router of B.

Here, 'A::B' refers to a path that passes through the boundaries of two ASes. For example, 'A::B' refers to a path that connects the egress of AS A with the ingress of AS B.

In ':A:', the colon mark (:) refers to the router of an AS. The ':' mark located on the left side of 'A' refers to the ingress router of AS A, while the ':' mark located on the right side of AS A refers to the egress router of AS A. Accordingly, ':A:' refers to a path segment from the ingress router of AS A to the egress router thereof. In the same way, 'A::B' refers to a path segment from the egress router of AS A to the ingress router of AS B.

A longer path can be expressed by connecting an intra-domain path with an inter-domain path. For example, ':A::B' that is formed by connecting ':A:' with 'A::B' is a set of IP paths that connect ingress of AS A to the ingress of AS B. In order to find all IP paths corresponding to AS path A1 A2 . . . An, :A1::A2 . . . An−1::An: can be obtained by connecting :A1:, A1::A2, . . . , An−1::An and :An: with each other.

3. Index Building

The data of CAIDA Ark used in the present invention include a great number of point-to-point traceroute results. When a traceroute command is executed once, hop-based IP addresses and transmission delay taken for each hop are obtained for an Internet path from a starting point at which the command is executed to a destination. CAIDA Ark is storage in which results that are obtained by installing monitors at about 20 points on the Internet and periodically running traceroutes for all routable /24 IP prefixes on the Internet using the respective monitors have been collected.

One purpose of the present invention is to enable information about desired paths to be easily obtained by rearranging a great number of traceroutes in a searchable configuration.

In order to search for needed actual traceroute measurement result using AS numbers (for example, in order to search for a traceroute result corresponding to AS path A B C D), IP addresses constituting each actual traceroute measurement result of Ark data storage are translated into AS numbers, as shown in FIG. 1, and each portion of the traceroute result is indexed with an AS number.

Assume that one traceroute result corresponds to AS path ABCX. Here, like AS paths ABCX, ABC, BCX, AB, BC, CX, A, B, C and X, indexes can be built for all the possible sub-paths of path ABCX. However, if indexes are built in this way, storage space corresponding to $O(1^2)$ is required when the length of the AS path is 1. Accordingly, as the number of AS paths and the length of each path increase, an immense amount of space is required, so that extendable design is impossible.

Instead of $O(1^2)$ indexes, indexes are built with AS paths divided into intra-domain paths and inter-domain paths. That is, for AS path ABCX, only O(1) indexes, that is, AB, BC, CX, A, B, C and X are built.

For example, assume that two actual traceroute measurement results between hosts a and b and between hosts a' and b' are indexed. The actual traceroute measurement results between hosts a and b are a a1 a2 b1 b2 b, and the actual measurement results between hosts a' and b' are a' a1 a3 b3 b2 b'. Transmission delay information is attached to each IP hop. The indexing results of the actual traceroute measurement results are as follows:

:A:(a,a$_2$) via a$_1$ has delay d$_A$
(a,a$_3$) via a$_1$ has delay d$_A$
A::B(a$_2$,b$_1$) has delay d$_{AB}$
(a$_3$,b$_3$) has delay d$_{AB}$
:B:(b$_3$,b') via b$_2$ has delay d$_B$
(b$_1$,b) via b$_2$ has delay d$_B$ The present invention is configured such that each piece of actual path measurement information is divided into path segments and the respective path segments are indexed with AS numbers. Path segments may be classified into two types: intra-domain segments and inter-domain segments. An inter-domain segment is a path segment that connects an ingress, intermediate, and/or egress routers within the same AS or domain, and is presented as ':A:' or ':B:' in the above indexing results. An inter-domain segment is a path segment that connects the boundaries of two domains, and is represented as 'A::B' in the above indexing results.

Figure 2:
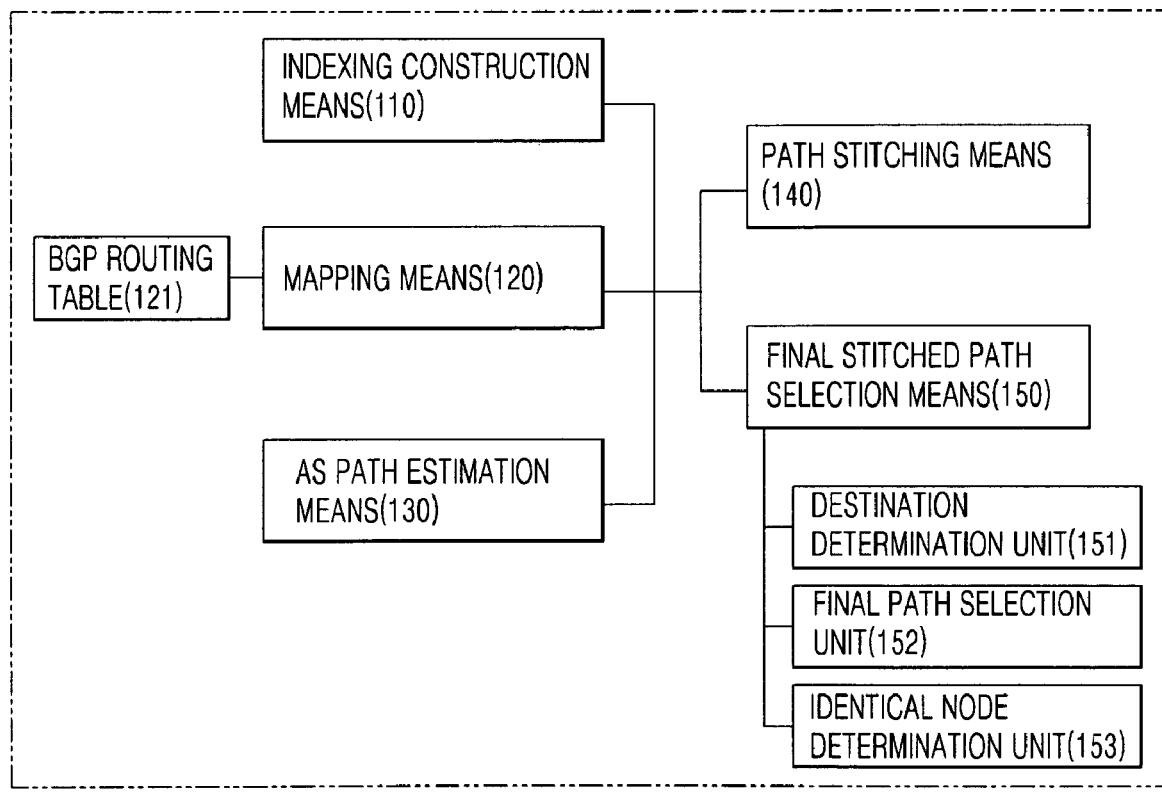
FIG. 2 is a diagram schematically showing a system for estimating an Internet-wide transmission path and transmission delay according to the present invention.

FIG. 2 is a diagram conceptually illustrating the construction of a system 100 for estimating an Internet-wide transmission path and transmission delay (hereinafter 'estimation system') according to the present invention. As illustrated in this drawing, the estimation system 100 includes indexing construction means 110, mapping means 120, AS path estimation means 130, path stitching means 140, and final stitched path selection means 150.

In detail, the indexing construction means 110 is storage for storing the results of the actual measurements of transmission delay for all destinations (traceroute results) on the Internet. In order to search for needed actual measurement results using AS numbers, the indexing construction means 110 translates IP addresses constituting actual measurement results into AS numbers, indexes each path segment with an AS number, and performs storage.

The mapping means 120 maps the IP addresses of two points queried by a user to AS numbers using a BGP routing table 121.

Each of the IP addresses is mapped to the longest prefix longest matching IP prefix in a BGP routing table, and the last hop AS of the AS-PATH attribute of this prefix is regarded as an AS number from which the corresponding IP address originated.

Here, the 'IP prefix' is a prefix of IP addresses, and is means for representing a set of IP addresses on the Internet in a practical sense. For example, IP prefix 143.248.0.0/16 is a set of IP addresses that belong to 143.248.0.0/16 network. This set may include IP addresses such as 143.248.182.73 and 143.248.134.127, that is, all IP addresses ranging from 143.248.0.0~143.248.255.255.

In the BGP routing table, pieces of information about paths through which packets must be sent so as to send the packets to, corresponding IP prefixes is recorded for all IP prefixes that belong to the Internet. Such pieces of information are referred to as the attributes of the entries of the BGP routing table. Among these attributes, an attribute named AS-PATH specifies an AS path through which a packet passes when the packet is sent to a corresponding IP prefix. For example, if the specified AS path is ABCD, this means that a packet departs from AS A, passes through AS B and AS C and then reaches AS D, with the result that it may be estimated that the corresponding IP prefix originated from AS D.

The AS path estimation means 130 estimates the AS path between the two AS numbers to which mapping has been performed by the mapping means 120.

For this purpose, the present invention adopts KnownPath, which is Qiu and Gao's methodology. This methodology uses known AS paths present in the BGP routing table, and estimates the AS path between specific two AS numbers in such a way as to extend such reliable AS paths in steps.

For reference, Qiu and Gao's methodology will be described below in brief.

The problem of estimating the AS path between AS A and AS D is taken as an example. The Internet may be abstracted as a graph having a plurality of ASes as nodes. However, the correct AS path from AS A to AS D cannot be found using a method for finding the shortest path from AS A to AS D.

Although the shortest path estimation method works accurately within a single AS, the Internet traffic transport between an AS and another AS is not simple because it follows the commercial contact relationship between the two ASes. For example, assume that network C has a link connected to ISPs A and B (a multi-homed link). Meanwhile, when ISP A sends a packet to ISP B, ISP A does not use the estimated shortest path A C B. The reason for this is that although a path is present between them, there is no reason for the use of this path, that is, the use of consumer network C, for the traffic transport between the service providers A and B according to the commercial contact relationship between network C and ISPs A and B.

Gao discovered that a suggestive relationship, such as provider-customer, customer-provider, peer-peer or sibling-sibling relationship, exists between two arbitrary ASes on the Internet according to a commercial contact relationship (since there is no disclosed data about the contact relationship and the respective ASes consider the relationship to be secret and do not disclose the relationship, the relationship can be estimated only through a reasonable inference), and the accurate AS path between two ASes can be estimated only when the relationship is accurately inferred. Furthermore, she suggested that a correct AS path must follow a 'valley-free property.' The 'valley-free property' means that once a packet passes through a Provider-customer or Peer-peer AS link in an AS path, it cannot pass through a customer-provider or another peer-peer AS link. Assuming that a customer AS is located in the lower end of an AS graph, a provider AS is located in the upper end and peer ASes are located at the same level, the AS path takes only a mountain shape and cannot include a valley therein.

Qiu and Gao's methodology maximally utilizes AS paths known from a BGP routing table. These known AS paths are incomplete, but partially contain suggestions of AS paths that are actually used on the Internet. For example, assume that C D is specified as a partial path from an arbitrary AS to AS D in a BGP routing table. Furthermore, assume that it can be seen from the BGP routing table that a connected link is present between AS A and AS B and a connected link is present between AS B and AS C. In the BGP routing, it cannot be assumed that a packet is necessarily sent through a connected link even when there is the connected link.

Here, the estimation of the AS path from AS A to AS D is attempted. Since inference starts from AS path C D, which is a known path, and a connected link between the neighboring AS B of AS C and the neighboring AS A of AS B is given, it is checked whether AS path A B C D satisfies a valley-free property. If the path satisfies the valley-free property, AS path A B C D is estimated to be the AS path from AS A to AS D. In this case, it is sure that information about partial path C D is reliable, but it is not sure that the extended part A B is reliable. When an AS path is estimated using this method, a plurality of alternative AS paths can be estimated between two arbitrary ASes, in which case a path having the shortest doubtful path (having the longest reliable path) is selected.

The path stitching means 140 obtains a plurality of stitched paths by searching for respective path segments constituting an estimated AS path, stitching the path segments together and stitching the IP paths corresponding to the AS path, and transmission delay for the stitched paths. Here, the path stitching means 140 searches for and uses indexed path segments stored in the indexing construction means 110.

For example, assume that an AS path estimated through the AS path estimation means 130 is path A B C. In order to find IP paths corresponding to AS path A B C, :A::B::C: is created by searching for and stitching inter-domain path segments :A:, :B: and :C: and intra-domain path segments A::B and B::C.

For example, in order to connect :A: and A::B with each other, at least one of path segments belonging to :A: must be accurately connected to one of path segments belonging to A::B (IP addresses at both ends must coincide with each other).

If accurately connected path segments cannot be found, a process of performing stitching based on the closeness between IP addresses at both ends of path segments is additionally required. For example, assume that the last hop IP address of :A: path segment is a, the first IP address of A::B is a' and IP addresses a and a' are different from each other. In this case, if, as a result of the determination at the step of sequentially determining whether a and a' are IP addresses that belong to the same router, whether they are addresses that belong to the same PoP, and whether they are addresses that belong to the same longest IP prefix, there is a corresponding case, connection is performed in consideration of the similarity between both ends of the corresponding :A: path segment and the A::B path segment.

Another case where path segments cannot be stitched together is the case where a path between arbitrary domains are not presented in our actual measurement data set. For example, it is the case when :A: and :B: need to be stitched together, A::B does not exist. In this case, if B::A exists, a process of allowing the use of reverse path segments and stitching :A: and :B: together is performed.

There may be a plurality of paths that are obtained through the stitching of the above-described process. Accordingly, a stitched path that can be estimated to be most accurate by the final stitched path selection means 150 must be selected and transferred to a querier.

The final stitched path selection means 150 determines whether the path segments used for the stitching by the path stitching means 140 are path segments that are actually used to reach the destination queried by the querier, thereby functioning to select a final stitched path closest to an actual path. The final stitched path selection means 150 includes a destination determination unit 151 and a final path selection unit 152. The above determination is performed through the indexing construction means 110 that stores path segments for all destinations on the Internet, which are indexed with AS numbers, as described above.

In detail, the destination determination unit 151 determines whether the path segments used for the stitching by the path stitching means 140 are actually used to reach the destination queried by the user.

If the path segments are path segments that are used to reach the destination queried by the user, the final path selection unit 152 assigns priorities to respective stitched paths in the order of the number of path segments that are actually used to reach the destination queried by the user, determines a stitched path having the largest number of actually used path segments to be a final stitched path closest to an actual path, and selects the stitched path.

That is, assume that a user's queries are an Internet-wide transmission path and transmission time between www.kaist.ac.kr and www.snu.ac.kr, and assume an estimated AS path to be KAIST HANARO KT SNU. Here, there may be many path segments passing through intermediate AS HANARO, that is, path segments :HANARO:. These path segments do not only include path segments originally used to reach AS SNU (in the case where an actual traceroute measurement packet transferred from a CAIDA Ark monitor to AS SNU passes through AS HANARO), but also include path segments originating from actual traceroute measurement results for the case where a packet is transferred to a completely different destination such as AT&T or SPRINT. As described above, a stitched path, including the largest number of path segments determined to be path segments actually used to reach SNU, among path segments that belong to :KAIST:, KAIST::HANARO, :HANARO:, HANARO::KT, :KT:, KT::SNU and :SNU:, is searched for.

Meanwhile, the final stitched path selection means 150 may further include a topologically closest node determination unit 153 for determining whether a stitched path having an end node which is close to a destination node queried by the user exists among the stitched paths, and, if the stitched path exists, determining the stitched path to be a final stitched node closest to an actual path, and selecting the stitched node as the final stitched path.

This is configured to search stitched paths for a stitched path closest to an answer to the user's query from the aspect of Internet topology.

For example, assume that a user queries an Internet-wide transmission path and transmission time between hosts a and c on the Internet. In this case, an estimated AS path is A B C. For this AS path, path segments :A:, :B:, and :C:, which are inter-domain path segments, and path segments A::B and B::C, which are intra-domain path segments, are stitched into :A::B::C:.

This stitched path is a set of paths from AS A to AS C, more accurately a set of paths from the ingress router of AS A to the egress router of AS C. Meanwhile, the user's query is intended to find a path from specific host a within AS A to specific host c within AS C. According to the above-described notation, this is better denoted by aA::B::Cc. Since the above-described data set is very limitative, a possibility of hosts 'a' and 'c' actually existing in the above-described actual measurement data set is very weak. Accordingly, a path closest to aA::B::Cc, that is, a'A::B::Cc', is searched for in path set :A::B::C:.

A method of searching for 'a'' closest to 'a' is performed by sequentially performing the step of searching for 'a'' belonging to a router to which 'a' belongs, the step of searching for 'a'' belonging to PoP to which 'a' belongs, and the step of searching for 'a'' belonging to the longest IP prefix to which 'a'' belongs. In the step of searching for 'a'' that belongs to the longest IP prefix, 'a'' that belongs to a more specific IP prefix is determined to be more accurate. For example, if a certain 'a'' belongs to /24 IP prefix to which 'a' belongs while 'a''' belongs to /28 IP prefix to which 'a, 'a''' is determined to be a host closer to 'a' than the host 'a''.

Figure 3:
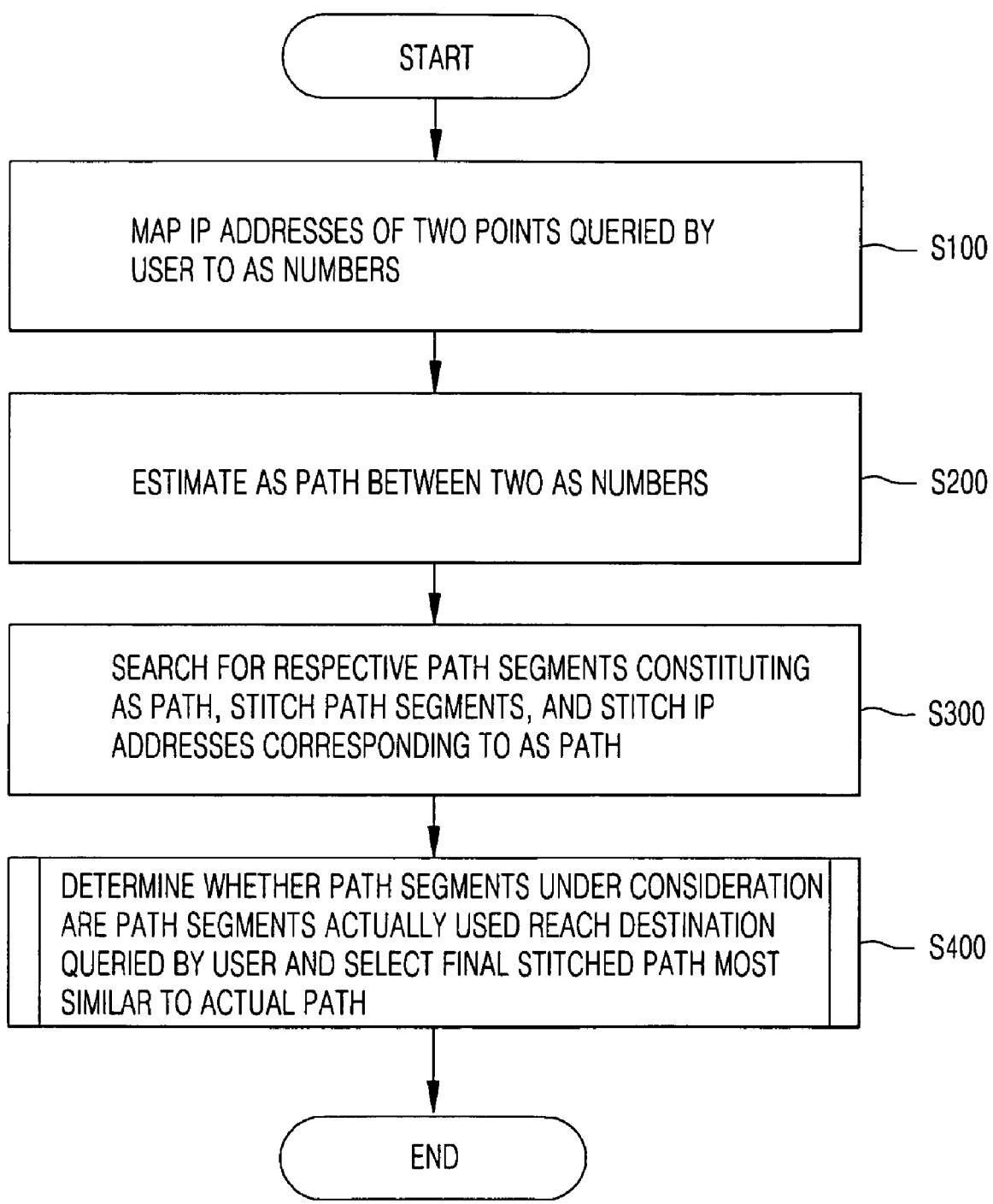
FIG. 3 is a general flowchart showing a method of estimating an Internet-wide transmission path and transmission delay according to the present invention.
Figure 4:
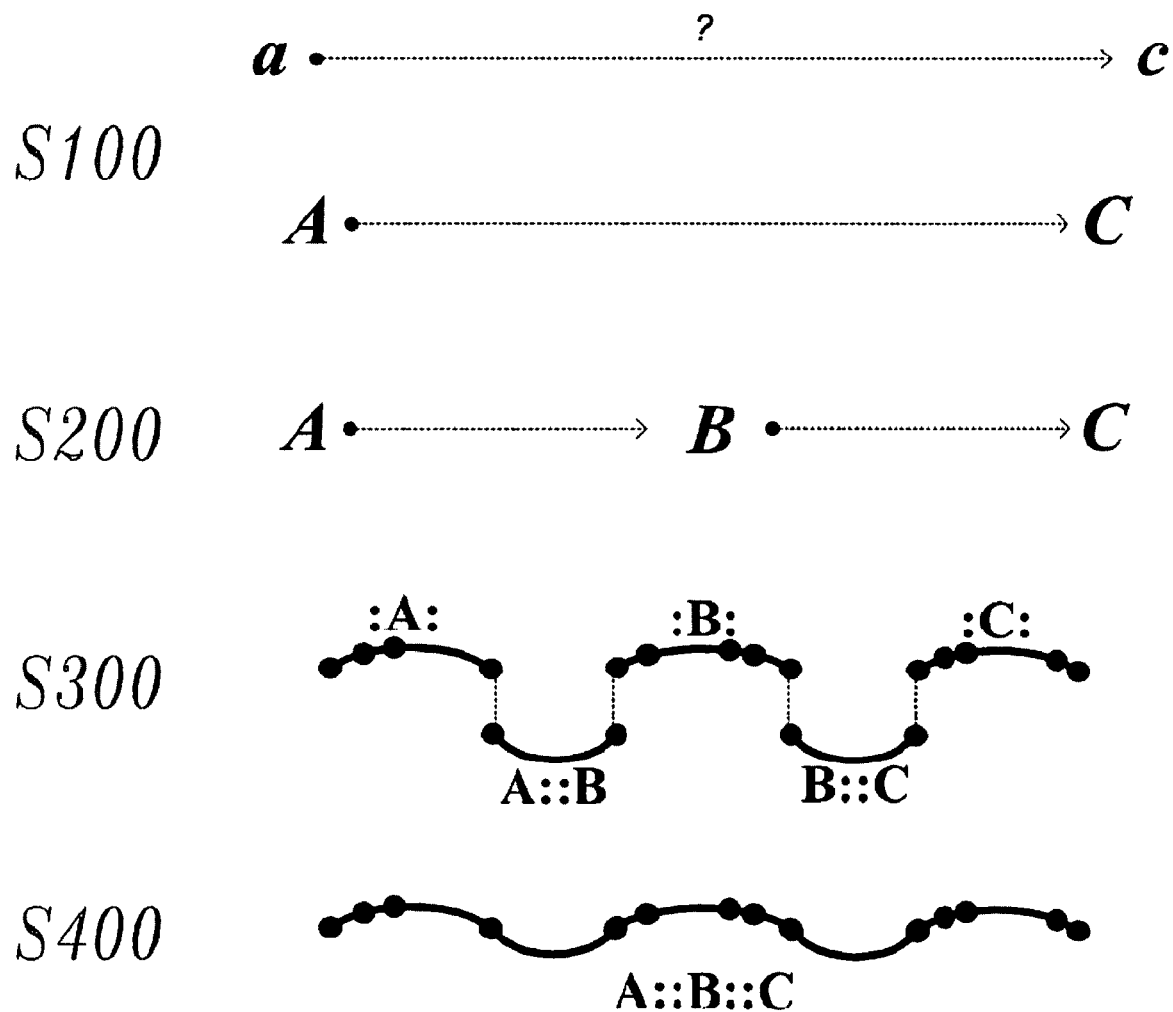
FIG. 4 is a diagram schematically showing an example of the flow of the estimation of an Internet-wide transmission path and transmission delay according to the present invention.

FIG. 3 is an overall flowchart showing a method of estimating an Internet-wide transmission path and transmission delay according to the present invention, and FIG. 4 is a diagram schematically showing an example of the flow of the estimation of an Internet-wide transmission path and transmission delay according to the present invention.

As shown in FIGS. 3 and 4, the mapping means 120 maps two IP addresses queried by a user to AS numbers at step S100.

Thereafter, the AS path estimation means 130 estimates an AS path between the two AS numbers to which the ID addresses have been mapped at step S100 at step S200.

Thereafter, the path stitching means 140 searches for respective path segments constituting the estimated AS path through the indexing construction means 110, stitches the path segments together, and stitches IP paths corresponding to the AS path, thereby obtaining a plurality of stitched paths and corresponding transmission delay at step S300.

At the preceding step S300, two or more results are obtained through stitching in most cases. Among these results, some may be similar to an actual Internet path, while the remaining results may be very different from the actual Internet path. Steps S100 to S300 will be described using an example.

The estimation of the path between hosts 'as' and 'bd' is desired. At step S100, 'as' is mapped to AS A, and 'bd' is mapped to AS B. At step S200, the AS path between A and B is estimated to be path AB. At step S300, an Internet-wide transmission path and transmission delay passed through and taken when a packet is sent through AS path AB from 'as' to 'bd' is obtained by searching indexed path segment data.

From the foregoing indexing results, two stitched paths regarding paths 'as' and 'bd' are obtained as follows:

$(a,a_2),(a_2,b_1),(b_1,b)$ with delay $d_A+d_{AB}+d_B$ $(a',a_3),(a_3,b_3),(b_3,b')$ with delay $d'_A+d'_{AB}+d'_B$ As illustrated in the above example, a stitched path that connects AS A with AS B can be obtained.

However, since two or more paths may be obtained through stitching, a stitched path closest to an actual path must be determined.

Accordingly, the final stitched path selection means 150 determines whether path segments used for the stitching by the path stitching means 140 are path segments that are actually used to reach the destination queried by the querier, thereby selecting a final stitched path most similar to the actual path at step S400.

Figure 5:
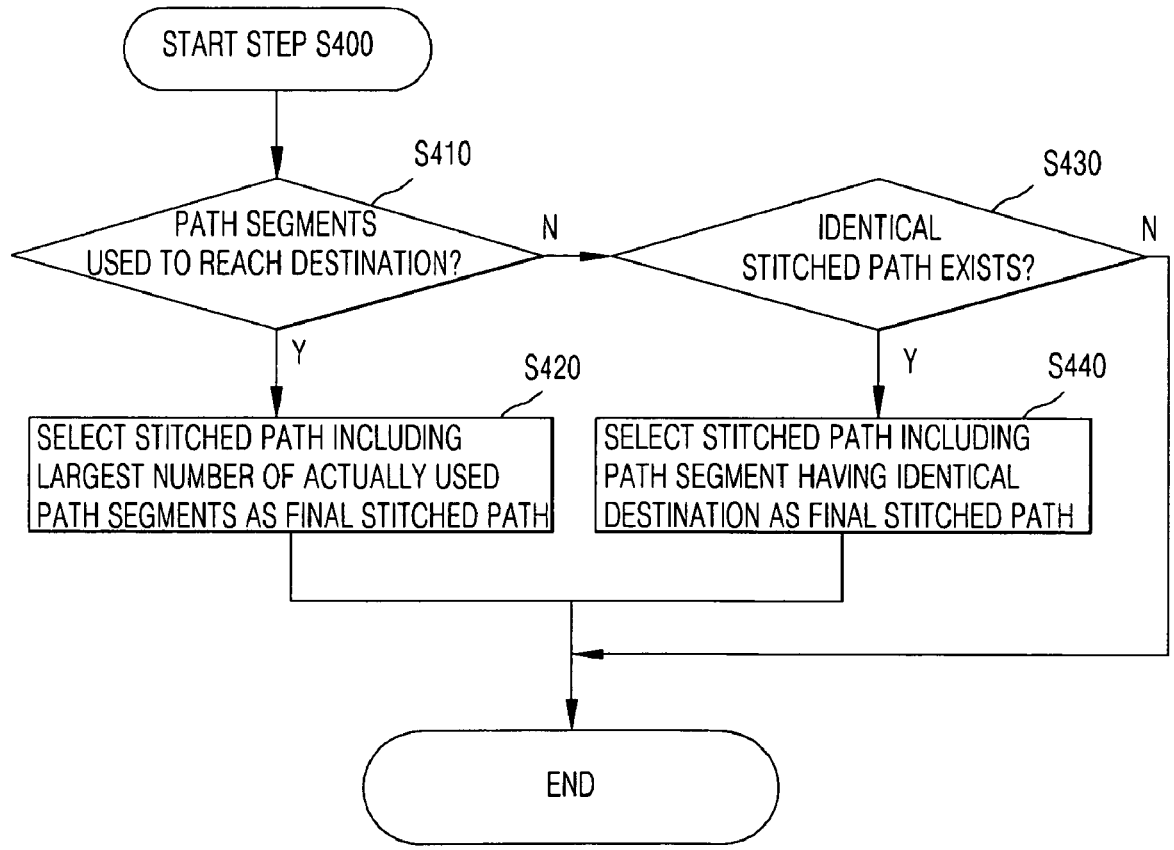
FIG. 5 is a detailed flowchart of step S400 according to the present invention.

In detail, referring to FIG. 5, the detailed steps of step S400 according to the present invention will be described below. As shown in this drawing, the destination determination unit 151 of the final stitched path selection means 150 determines whether the path segments used for the stitching by the path stitching means 140 are path segments that are actually used to reach the destination queried by the user at step S410.

If, as a result of the determination at step S410, the path segments are determined to be path segments that are actually used to reach the queried destination, the final path selection unit 152 assigns priorities to respective stitched paths in the order of the number of included path segments that are actually used to reach the destination queried by the user, determines a stitched path having the largest number of actually used path segments to be a final stitched path most similar to the actual path, and selects the stitched path as the final stitched path at step S420.

In contrast, if, as a result of the determination at step S420, the path segments are determined not to be path segments that are actually used to reach the destination queried by the user, the identical node determination unit 153 determines whether a stitched path having an end node identical to the destination node queried by the user exists among the stitched paths at step S430.

If, as a result of the determination at step S430, a stitched path having an end node identical to the destination node queried by the user is determined to exist, the identical node determination unit 153 determines the stitched path to be a final stitched node most similar to the actual path and selects the stitched path as the final stitched path at step S440. Meanwhile, if a stitched path having an end node identical to a destination node queried by the user does not exist, the identical node determination unit 153 terminates the process.

According to the above-described present invention, additional, active Internet actual measurement work can be avoided, so that there is an advantage in that processing delay that may occur at the time of query submission can be minimized.

Furthermore, according to the present invention, since a querier can query two arbitrary points that are not directly connected to the querier on the Internet, rather than querying a path having the querier himself or herself as a source or a destination, there is an advantage in that the present invention is more suitable for the implementation of a more general type of Internet performance query/response system.

Furthermore, according to the present invention, there is an advantage in that in the case where a querier cannot directly pose queries, the querier located behind a router or firewall for filtering actual measurement packets can pose queries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for estimating an Internet-wide transmission path and transmission delay, comprising:
   indexing construction means configured to function as storage for storing results of actual measurement of transmission delay for all destinations on an Internet, and configured to, in order to search for necessary actual measurement results using Autonomous System (AS) numbers, translate IP addresses constituting the actual measurement results into AS numbers, index respective path segments with AS numbers and store them;
   mapping means for mapping IP addresses of two points queried by a user to AS numbers;
   AS path estimation means for estimating an AS path between the two AS numbers obtained through the mapping by the mapping means; and
   path stitching means for searching for respective path segments constituting the estimated AS path, stitching the found path segments together and stitching IP paths corresponding to the AS, thereby obtaining a plurality of stitched paths and corresponding transmission delay.

2. The system as set forth in claim 1, further comprising final stitched path selection means for determining whether the path segments used for the stitching by the path stitching means are path segments that are actually used to reach a destination queried by a querier, thereby selecting a final stitched path.

3. The system as set forth in claim 2, wherein the final stitched path selection means comprises:
   a destination determination unit for determining whether the path segments used for the stitching by the path stitching means are path segments actually used to reach a destination queried by the user; and
   a final path selection unit the path segment for, if the path segments are path segments actually used to reach a destination queried by the user, assigning priorities to the stitched paths in order of a number of path segments actually used to reach the destination queried by the user, determining a stitched path having a largest number of actually used path segments as a final stitched path, and selecting the stitched path as the final stitched path.

4. The system as set forth in claim 3, wherein the final stitched path selection means 150 further comprises an identical node determination unit for determining whether a stitched path having an end node identical to a destination node queried by the user exists among the stitched paths, and, if the stitched path having an end node identical to a destination node exists, selecting the stitched path as a final stitched path.

5. The system as set forth in claim 3, wherein the final stitched path selection means searches for destinations for the respective path segments through the indexing construction means for storing path segments indexed with AS numbers.

6. The system as set forth in claim 1, wherein the path stitching means searches for and uses indexed path segments stored in the indexing construction means.

7. The system as set forth in claim 1, wherein the mapping means maps the IP addresses to the AS numbers using a Border Gateway Protocol (BGP) routing table, each of the IP addresses being mapped to a longest prefix.

8. A method of estimating an Internet-wide transmission path and transmission delay, comprising steps of:
   (a) mapping means mapping IP addresses of two points queried by a user to AS numbers;
   (b) AS path estimation means estimating an AS path between the two AS numbers to which the IP addresses are mapped at step (a); and
   (c) path stitching means searching for path segments constituting the estimated AS path through an indexing construction means, stitching the path segments together, and stitching IP paths corresponding to the AS path, thereby obtaining a plurality of stitched paths and corresponding transmission delay.

9. The method as set forth in claim 8, further comprising, after step (c), step (d) of final stitched path selection means determining whether the path segments used for the stitching by the path stitching means are path segments actually used to reach a destination queried by a querier, thereby selecting a final stitched path.

10. The method as set forth in claim 9, wherein step (d) comprises steps of:
    (d-1) the final stitched path selection means determining whether the path segments used for the stitching by the path stitching means are path segments actually used to reach the destination queried by the user; and
    (d-2) if, as a result of the determination at step (d-1), the path segments are determined to be the path segments actually used to reach the destination queried by the user, the final stitched path selection means assigning priorities to the stitched paths in order of a number of path segments actually used to reach the destination queried by the user, determining a stitched path having a largest number of actually used path segments as a final stitched path, and selecting the stitched path as the final stitched path.

11. The method as set forth in claim 10, further comprising, after step (d-2),
    (d-3) if, as a result of the determination at step (d-1), the path segments are determined not to be the path segments actually used to reach the destination queried by the user, the final stitched path selection means determining whether a stitched path having an end node identical to a destination node queried by the user exists among the stitched paths; and
    (d-4) if, as a result of the determination at step (d-3), the stitched path having an end node identical to the destination node queried by the user is determined to exist, the final stitched path selection means determining the stitched path to be the final stitched path, and selecting the stitched path as the final stitched path.

12. The method as set forth in claim 9, wherein step (d) comprises searching for destinations for the respective path segments through the indexing construction means for storing path segments indexed with AS numbers.

13. The method as set forth in claim 8, wherein step (a) comprises mapping the IP addresses to the AS numbers using a BGP routing table, each of the IP addresses being mapped to a longest prefix.

14. The method as set forth in claim 8, wherein step (c) comprises the path stitching means searching for and using indexed path segments stored in the indexing construction means.

* * * * *